May 30, 1961 J. W. BROUILLETTE, JR 2,986,643
FORM RECOGNITION METHOD AND SYSTEM
Filed Sept. 30, 1957
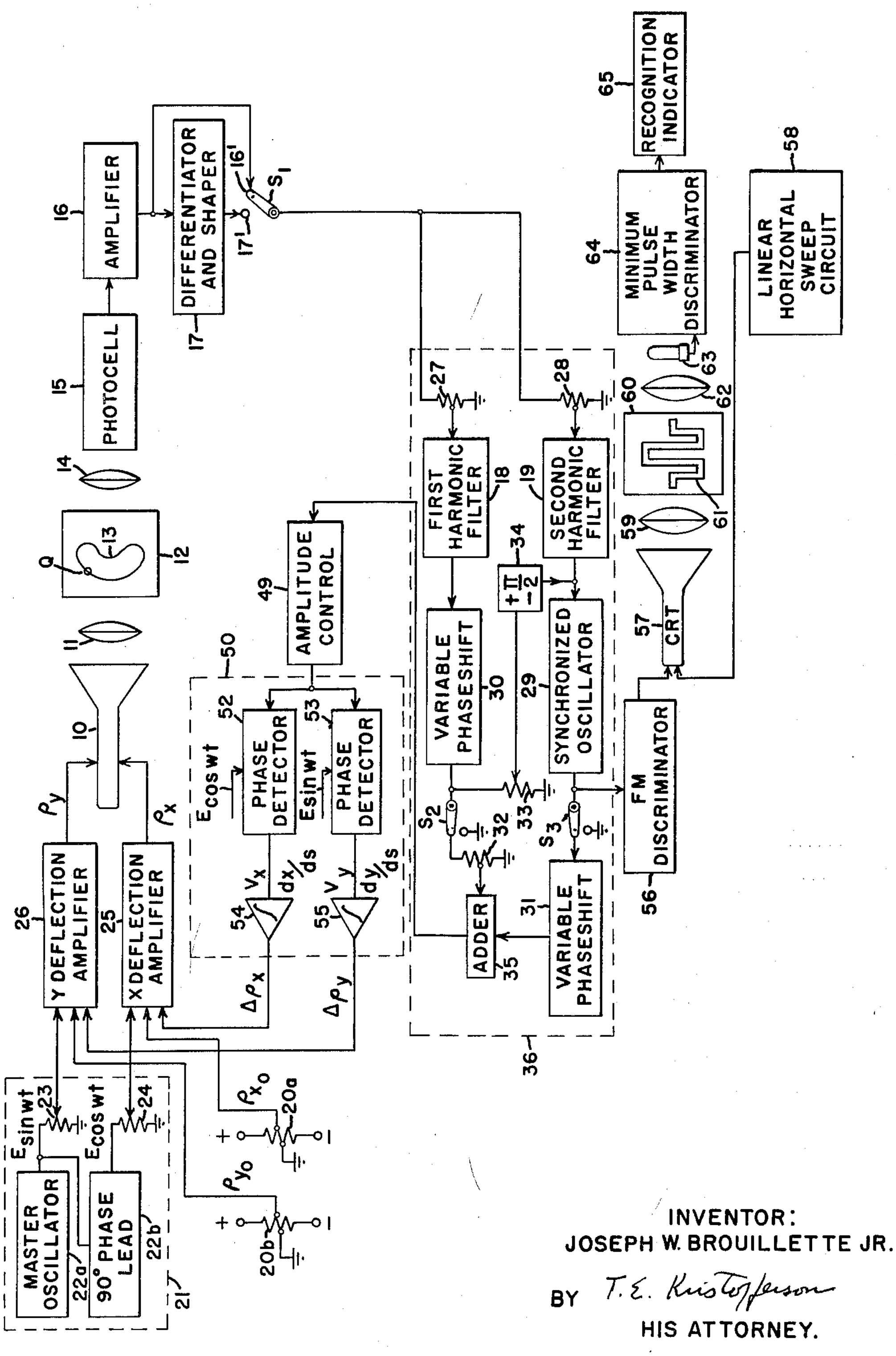
INVENTOR:
JOSEPH W. BROUILLETTE JR.
BY T. E. Kristofferson
HIS ATTORNEY.

United States Patent Office 2,986,643

Patented May 30, 1961

2,986,643

FORM RECOGNITION METHOD AND SYSTEM

Joseph W. Brouillette, Jr., Syracuse, N.Y., assignor to General Electric Company, a corporation of New York Filed Sept. 30, 1957, Ser. No. 687,113

10 Claims. (Cl. 250—202)

This invention relates to a form recognition method and system employing comparisons between invariant functions of a curve and a stored set of such invariant functions for a standard set of curves for recognizing substantial coincidence therebetween. More particularly, the invention relates to such a method and system employing means for recognizing such forms or curves by an invariant which is a function representative of the curvature of the curve versus the scan time.

Prior form recognition systems relay in large on a correspondence directly between the stored memory and the curve to be recognized. Such a system requires at least the transformations of rotation, translation and magnification or demagnification before a correspondence exists. Such transformations are time consuming and their elimination has been a problem long existing in the art.

This problem has been recognized by applicant and his co-workers, and one solution has been offered in application Serial No. 618,606, filed October 26, 1956, by C. W. Johnson et al. and assigned to the assignee of the present invention. The system has been further implemented as described in application Serial No. 618,504, filed October 26, 1956, by J. W. Brouillette et al. and an application Serial No. 618,553, filed October 26, 1956, by C. W. Johnson, both of which are also assigned to the assignee of the present invention. Further refinements are disclosed in application Serial No. 679,512, filed August 21, 1957, by J. W. Brouillette and in application Serial No. 687,112 by J. W. Brouillette—Form Recognition Method and System Therefor, filed concurrently herewith, both of which are also assigned to the assignee of the present invention. Accordingly, it is an object of the present invention to provide a form recognition system which can recognize a curve independently of at least its translation and rotation, and preferably also magnification.

Another object of this invention, is to provide means for deriving signals representative of invariant functions of a curve to be recognized.

A further object of this invention is to provide an invariant function representative of the curvature of the curve versus scan time, which is invariant with translation, rotation and magnification.

A still further object of this invention, is to provide such a system utilizing a minimum number of components to derive such an invariant in the most expedient manner.

In carrying out the invention in one form thereof, signals are generated by a curve follower comprising a carrier having a phase representative of the direction angle of the curve. Means are provided for discriminating this carrier to obtain a function representative of the curvature of the curve versus scan time. This function may then be displayed optically and compared with a stencil containing a stored standard function derived in a similar manner from a standard curve to recognize substantial correspondence therebetween which will indicate recognition.

The novel features characteristic of the invention are set forth with particularity in the appended claims. The invention itself, however, together with further objects and advantages thereof can best be understood by reference to the following description taken in connection with accompanying drawing, in which the single figure thereof is a block diagram of a system for deriving an invariant of the type mentioned above and for performing the process of recognition.

Turning now to the drawing, there is shown a form recognition system employing a flying spot scanner and associated circuitry similar to that disclosed in application Serial No. 618,553 referred to above. For purposes of convenience similar numerals have been used to designate components of the drawing that may be identical to those shown in Fig. 1 of this referenced application. Also, a description of the operation of the portion of the circuit shown here which is included in Fig. 1 of application Serial No. 618,553 would be identical to that contained in the referenced application.

The portion which is identical includes the cathode ray tube 10 and lens 11 which focus a spot on the stencil 12 which will trace out the perimeter of the curve 13. A second lens 14 focuses the light transmitted thru stencil 12 on a photocell 15. The output of photocell 15 is amplified in an amplifier 16 and is either passed through a differentiator and shaper 17 or directly from the amplifier 16 to a first harmonic filter 18 and a second harmonic filter 19. This can be done by properly positioning the switch $S_1$ to either the position 16′ or 17′. A constant bias for the deflection plates of cathode ray tube 10 is provided from sources 20A which biases the X deflection circuit and 20B which biases the Y deflection circuitry.

The proper frequency for traversing the search circle Q is derived from a reference oscillator 21 which contains a master oscillator 22A and a 90° phase lead 22B. The output of the master oscillator is a signal $E \sin wt$ and when this signal passes through 90° phase lead 22B the output is $E \cos wt$. These two signals are dropped across potentiometers 23 and 24 respectively. The output of potentiometer 24, taken between the tap and ground, is applied to an X deflection amplifier 25 and the output of potentiometer 23, taken from its tap to ground is applied to a Y deflection amplifier 26. These amplifiers 25 and 26 are in turn connected to the X and Y deflection plates of cathode ray tube 10 respectively.

The input to first harmonic filter 18 is taken from across a potentiometer 27 and the input to second harmonic filter 19 is taken across the potentiometer 28. Both potentiometers 27 and 28 are connected between $S_1$ and ground. The output of second harmonic filter 19 is fed to a synchronized oscillator 29. These elements form a part of what is termed the "progression channel." The output of first harmonic filter 18 is fed through a variable phase-shift 30. These two elements form a part of what is termed the "lock on channel." The output of synchronized oscillator 29 is fed through a variable phaseshift 31, or is grounded selectively by means of switch $S_3$. The output of variable phaseshift 30 may be selectively coupled to ground or to a potentiometer 32 by means of switch $S_2$. In addition, the output of variable phase shift 30 is applied across potentiometer 33. A portion of the signal across potentiometer 33, taken from between the tap and ground, is applied through a phaseshift 34 of $\pm\pi/2$ to the input of synchronized oscillator 29 in the progression channel. The outputs of variable phaseshift 31 and potentiometer 32 are both fed to an adder 35. The portion of the circuit enclosed in dashed line 36, ranging from potentiometers 27 and 28 through adder 35, may be considered to constitute a velocity voltage generator having an output voltage $V \cos (wt+\phi)$ where V represents the magnitude, $w$ represents $2\pi$ times the frequency and $\phi$ represents the phase of the velocity voltage signal.

This signal is fed through an amplitude control 49 to a block shown as dashed line 50, which may be termed a resolver and integrator since it resolves the A.C. voltage into orthogonal D.C. components. This block 50 includes phase detectors 52 and 53. Phase detector 52 receives as inputs the output of amplitude control 49 and a signal $E \cos wt$ which can be taken from the output of master oscillator 22A. The output of phase detector 52 is fed to an integrator 54 and the output of phase detector 53 is fed to an integrator 55. These outputs when integrated represent the change in X and Y coordinates. The output of integrator 54 is fed to X deflection amplifier 25 while that of integrator 55 is fed to Y deflection amplifier 26.

The portion of the circuit described above may be identical to that disclosed in the referenced filed application Serial No. 618,553. The operation of this portion of the circuit is also identical to that disclosed therein. This system causes the flying spot scanner to trace around the curve 13 and the system may be controlled, as disclosed in the referenced applications, to cause the spot to scan around the curve 13 in a uniform time.

The various voltages generated at the points around the system described above may be used to generate invariants which are representative of the curve 13. In this application the output of synchronized oscillator 29, which has a basic frequency equal to the fundamental or first harmonic of master oscillator 22A, is a voltage representing the tangential velocity to be imparted to the center of the search circle Q to cause it to ride along the curve 13, centered thereon. The output from synchronized oscillator 29 is fed to an FM discriminator 56. The output of discriminator 56 is supplied to one set of deflection plates of a cathode ray tube 57, here shown to be the vertical plates, and a linear horizontal sweep circuit 58 powers the horizontal deflection plates.

The spot on the face of cathode ray tube 57 is focused by means of a lens 59 on a stencil 60. This stencil 60 contains an invariant wave form 61 derived in a similar manner for a standard curve. If substantial correspondence exists between the trace generated on the cathode ray tube 57 and the standard curve 61, enough light will be collected by lens 62 to actuate photocell 63 and to actuate in turn a minimum pulse width discriminator 64 which will trigger a recognition indicator 65.

The recognition portion of the circuitry from cathode ray tube 57 through the recognition indicator 65 operates identically to that disclosed in the above referenced application Serial No. 679,512, Figs. 1 and 3.

Turning now to a description of the generation of an invariant function representative of the curve 13, when the direction of the curve 13 is changing the phase of the carrier will be shifting in time at the output of synchronized oscillator 29. This carrier frequency shift is proportional to the rate $d\alpha/dt$ at which the direction angle $\alpha$ of the curve is shifting with time. Since, $$\frac{d\alpha}{dt}=\frac{d\alpha}{ds}\times\frac{ds}{dt}$$

and $ds/dt=V$, where S is arc length and $ds/dt$ is speed, V, then $$\frac{d\alpha}{dt}=V\frac{d\alpha}{ds}$$

Now, since the speed is constant, the instantaneous frequency shift $\Delta f$ is proportional to $d\alpha/ds$. $d\alpha/ds$ is the rate of change of the direction angle with respect to arc length. This is the curvature and is a function which is invariant under translation and rotation. If the scan time of the curve 13 is standardized as suggested above, this function is also invariant under magnification, hence, if the output of synchronized oscillator 29 is supplied to an FM discriminator 56, as is done in Fig. 1, and the FM discriminator is tuned to the center frequency, in this case the 450 kc. frequency of master oscillator 22A, the output of discriminator 56 over the linear range will be a linear plot of curvature as the search circle Q traces out the curve 13.

FM discriminator 56 may be a Seely Foster circuit such as that disclosed in Fig. 8 of the concurrently filed referenced application Serial No. 687,112. An operational embodiment has been constructed employing a discriminator having the values given on the circuit diagram of Fig. 8 in the referenced concurrently filed application. There is no intent to limit the invention to these values, and in effect any circuit capable of performing the discriminating function would serve as well to carry out the invention claimed herein.

It will be obvious to those skilled in the art in light of the above referenced applications that signals generated at other points in the curve follower described in Fig. 1 of this application and in referenced application Serial No. 618,553 may be treated in a similar manner to that described above with an FM discriminator in order to derive further functions which will be invariant under at least translation and rotation and in many cases also magnification. Such invariants are also considered to be within the scope of the broad claims appended hereto.

While the principle of the invention has now been made clear in the illustrative embodiment, there will be immediately obvious to those skilled in the art many modifications in structure, arrangement, proportion, elements, components used in the practice of the invention and otherwise which are particularly adapted for specific environments and operating requirements without departing from these principles. The appended claims are therefore intended to cover and embrace any such modifications within the limits only of the true spirit and scope of the invention.

What I claim as new and desire to secure by Letters Patent of the United States is:

1. Apparatus for deriving an invariant function in a form recognition system comprising means for generating a carrier modulated in both amplitude and phase responsive to a characteristic of a functional relationship of the coordinates of a curve to be recognized and means for detecting the rate of change of the phase of said signal to obtain an invariant function representative of the rate of change of said signal versus scan time.

2. Apparatus for deriving an invariant function in a form recognition system comprising means for generating a carrier having a phase representative of the direction angle of a curve to be recognized and means for discriminating the carrier in a frequency modulated discriminator to obtain an invariant function representative of the curvature of the curve versus scan time.

3. Apparatus for form recognition comprising means for generating a carrier having a phase representative of the direction angle of a curve to be recognized, means for discriminating the carrier in an FM discriminator tuned to the center frequency of the carrier, means for detecting the output of the discriminator, and means for comparing the output of the discriminator with a stored set of similarly derived functions for standard curves for recognition of substantial correspondence therebetween.

4. Apparatus for generating an invariant function representative of a curve to be recognized comprising, curve follower means for generating a signal having amplitude and phase representative of a characteristic of a function relationship of the coordinates of said curve and means for obtaining the rate of change of the phase of said signal versus scan time.

5. Apparatus for generating an invariant function representative of a curve to be recognized comprising, curve follower means for generating a carrier having a phase representative of the direction angle of the said curve and means for discriminating said carrier to obtain a function representative of the curvature of said curve versus scan time.

6. The apparatus of claim 4 including means for adjusting said curve follower means to operate over a preselected scan time.

7. Apparatus for form recognition comprising curve follower means for generating a carrier having a phase representative of the direction angle of a curve to be recognized, an FM discriminator for discriminating said carrier to obtain a function representative of the curvature of said curve versus scan time, means for comparing said function with a stored set of similarly derived functions for a standard set of curves and means for indicating substantial correspondence therebetween.

8. Apparatus for generating an invariant function representative of a curve to be recognized comprising, curve follower means for generating a carrier having a phase representative of the direction angle of said curve, an FM discriminator for operating on said carrier to obtain a function representative of the curvature of said curve versus scan time, means for optically displaying said function, optical comparison means for comparing said function to a stored set of standard functions similarly derived for a set of standard curves and means for indicating substantial correspondence therebetween.

9. Apparatus for generating an invariant function of a curve representing the instantaneous curve direction comprising, means for generating a signal having a phase variation from a fixed frequency which is representative of the curve direction of a point on the curve, in respect to a set of fixed axes means for moving said point along the curve at a constant speed, means for detecting the frequency shift of said signal in respect to said fixed frequency so as to provide an output which is a measure of curvature.

10. Apparatus for generating an invariant function of a curve representing instantaneous curve direction, comprising means for generating an electron beam, means for focusing the beam to a spot on a search surface, means for displaying a curve to be followed on the search surface, means for deflecting the beam so as to move the spot in a small search circle at a predetermined constant frequency, means for deriving a voltage pulse each time the spot crosses the curve, means for generating a carrier voltage having a frequency equal to the predetermined frequency of rotation of said spot, means for modulating the frequency of said carrier voltage by varying its phase in response to variations in the time occurrence of said voltage pulses so as to generate a first signal whose phase variation from said predetermined frequency is representative of instantaneous curve direction, means for causing the search circle to trace out the curve at constant speed, a frequency sensitive discriminator, means coupling said first signal to said discriminator, means for obtaining a second signal from said discriminator whose amplitude is a function of the phase deviation of said first signal from said predetermined frequency and which is a measure of curvature.

References Cited in the file of this patent

UNITED STATES PATENTS

| | | |
|---|---|---|
| 2,538,065 | Wallace | Jan. 16, 1951 |
| 2,556,556 | Schmitt | June 12, 1951 |
| 2,646,465 | Davis | July 21, 1953 |
| 2,738,499 | Sprick | Mar. 13, 1956 |
| 2,766,931 | Maier | Oct. 16, 1956 |
| 2,894,248 | Relis | July 7, 1959 |

FOREIGN PATENTS

| | | |
|---|---|---|
| 165,669 | Australia | Oct. 18, 1955 |